United States Patent [19]

Ariyoshi et al.

[11] 4,259,659
[45] Mar. 31, 1981

[54] FLASHER APPARATUS FOR VEHICLES

[75] Inventors: Hiromi Ariyoshi, Kariya; Tiaki Mizuno, Toyota, both of Japan

[73] Assignee: Nippondenso Co., Ltd., Kariya, Japan

[21] Appl. No.: 114,741

[22] Filed: Jan. 24, 1980

[30] Foreign Application Priority Data

Feb. 13, 1979 [JP] Japan .................................. 54-15861

[51] Int. Cl.³ .......................... B60Q 1/38; G08B 5/38; G08B 21/00
[52] U.S. Cl. ................................... 340/73; 340/81 R; 340/642; 340/650; 340/641; 315/200 A
[58] Field of Search ...................... 340/73, 81 R, 81 F, 340/79, 71, 72, 67, 642, 331, 332, 650, 664, 661, 662, 663, 641; 307/10 LS; 315/77, 200 A; 331/65, 105; 361/42, 88, 91

[56] References Cited

U.S. PATENT DOCUMENTS

| | | | |
|---|---|---|---|
| 3,553,571 | 1/1971 | Fendt et al. | 340/650 |
| 3,706,007 | 12/1972 | Wu | 340/664 |
| 3,858,177 | 12/1974 | Kugelmann et al. | 340/73 |
| 3,914,737 | 10/1975 | Sato | 340/73 |
| 3,940,657 | 2/1976 | Kasiewicz et al. | 340/81 R |
| 4,150,359 | 4/1979 | Mizuno et al. | 340/73 |

Primary Examiner—John W. Caldwell, Sr.
Assistant Examiner—Donnie L. Crosland
Attorney, Agent, or Firm—Cushman, Darby & Cushman

[57] ABSTRACT

A flasher apparatus for vehicles capable of informing the presence of short-circuit in a direction indicating system and protecting the direction indicating system from burnout. The flasher apparatus receives both a flashing signal for energizing direction indicating lamps and a detection signal indicative of the electric current flowing to said direction indicating lamps. The detection signal is compared with a reference signal so that the short-circuit in the system is detected. Upon detection of the short-circuit, the direction indicating lamps are prevented from being energized to thereby inform the presence of short-circuit and protect the system. The short-circuit detecting operation is disabled for a period of time in which a comparatively large rush current flows to the direction indicating lamps.

3 Claims, 7 Drawing Figures

FLASHER APPARATUS FOR VEHICLES

BACKGROUND OF THE INVENTION

The present invention relates to a flasher apparatus for vehicles which is capable of protecting a load circuit upon the short-circuit in the load circuit including direction indicating lamps for indicating the turn direction and informing a vehicle operator of the short-circuit.

It is a general practice in a conventional flasher apparatus for vehicles that a direction indicating function and a lamp disconnection indicating function by which a disconnection in direction indicating lamps is indicated are provided. In the conventional apparatus, however, a protecting function for the case of a short-circuit in a load circuit is not provided. Therefore, the conventional apparatus operates normally even after the short-circuit and a vehicle operator is not informed of the short-circuit. If the vehicle operator unaware of the short-circuit keeps driving the vehicle, an excessive electric current flows through the load circuit during the operation of the flasher apparatus. This results in the overheat and burnout of a current detecting resistor and various connectors or the excessive discharge of a battery.

SUMMARY OF THE INVENTION

The present invention purposes to provide a flasher apparatus for vehicles which is capable of, when a short-circuit occurs in a load circuit including direction indicating lamps; preventing an excessive electric current from flowing through the load circuit and informing a vehicle operator of the short-circuit.

The flasher apparatus according to the present invention is particularly characterized by the following arrangements. The flasher apparatus receives both a flashing signal for energizing direction indicating lamps from a flasher circuit and a detection signal indicative of the electric load current flowing through the load circuit including the lamps so that the load current flowing through the load circuit is monitored when the load current is kept stable after the lamps are energized. If the short-circuit in the load circuit is detected from the magnitude of the load current, the flasher circuit is prevented from producing the flashing signal during at least a predetermined interval of time after the short-circuit is detected.

DETAILED DESCRIPTION OF THE PREFERRED EMBODIMENT

The present invention is described hereinunder with reference to the embodiment illustrated in the accompanying drawings. Referring to a block diagram illustrated in FIG. 1, a flasher apparatus has a series circuit comprising a storage battery 20 of a vehicle, a battery switch 19, a current detecting resistor 11 having a small resistance, a relay 10, a direction indicating switch 12 and direction indicating lamps 13 and functions to energize one of the lamps 13 by periodically energizing the relay 10 by a semiconductor integrated circuit comprising blocks 1–9 when the battery switch 19 and the direction indicating switch 12 are closed. Numerals 1 and 2 designate first and second comparators which are connected to receive a voltage developed across a resistor 11 (e.g. 0.01~0.1 ohm) which detects a total electric current flowing through the lamps 13. The first comparator 1 detects the presence and absence of disconnection in the lamps and applies a detection signal to a flasher actuation circuit 3 upon disconnection of the lamps 13 so that the flashing period and duty ratio are changed. The second comparator 2 detects the open and closed conditions of the switch 12 and a relay switch 1b and applies a detection signal to a flasher operation control circuit 4 and the flasher actuation circuit 3. The flasher actuation circuit 3 includes an oscillation circuit and a relay actuation circuit. The oscillation circuit has a charge-discharge capacitor 14 and a resistor 15 which are connected outside the integrated circuit. The oscillation is switched on and off in response to the output of the flasher operation control circuit 4 and the charge-discharge operation is controlled by the output of the second comparator 2. The threshold value of the oscillation circuit is changed by the output of the first comparator 1 upon disconnection of the lamps 13 so that the flashing conditions of the lamps 13, the flashing frequency and duty ratio, are changed. On the other hand the relay actuation circuit is controlled by the oscillation circuit to actuate the relay 10.

Figure 1:
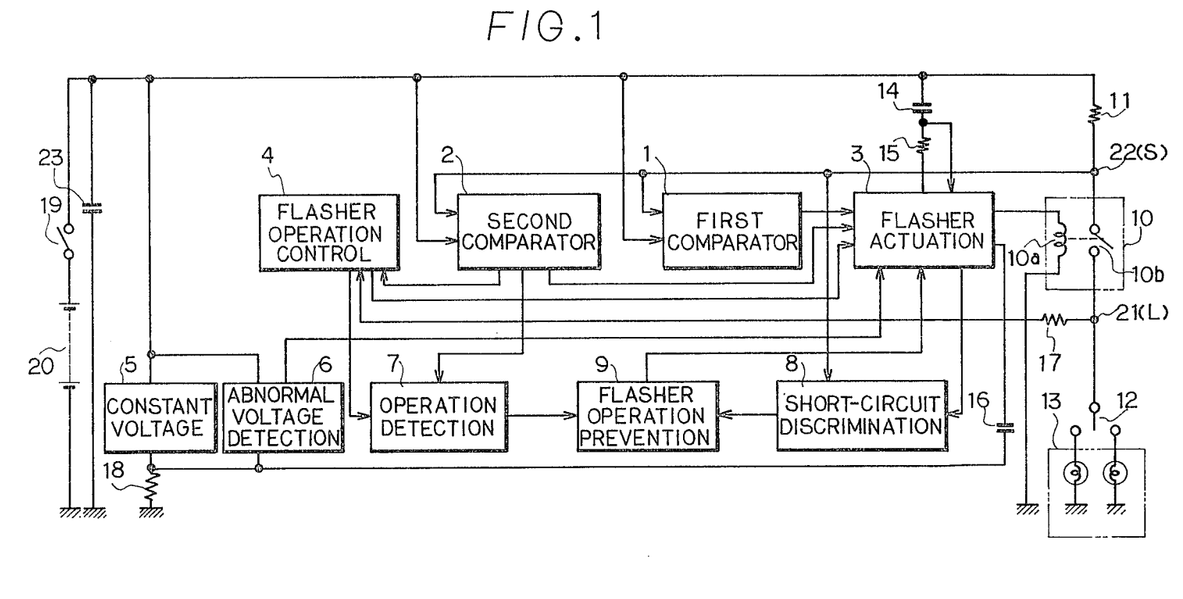
FIG. 1 is a block diagram showing the embodiment of the invention.

The flasher operation control circuit 4 receives the outputs from the second comparator 2 and an L-terminal 21 and stops the operation of the flasher actuation circuit 3 when the switch 12 or the relay switch 10b is kept open and the L-terminal 21 is kept at the battery voltage. Numeral 5 designates a constant voltage circuit which regulates the voltages supplied to the blocks 1, 2, 3, 4, 7, 8 and 9 of the semiconductor integrated circuit. An abnormal voltage detection circuit 6 detects an abnormal voltage appearing on a supply bus and controls the flasher actuation circuit 3 so that the relay 10 is forcibly energized and the abnormal voltage is prevented from being applied to the semiconductor integrated circuit.

Numerals 7, 8 and 9 designate an operation detection circuit, a short-circuit discrimination circuit and a flasher operation prevention circuit respectively which constitute a short-circuit protection circuit. The short-circuit protection circuit detects the presence and absence of the short-circuit in a load circuit including the lamps and, when the short-circuit is present, stops the flashing operation of the flasher actuation circuit 3 or make the flashing interval of time large enough to decrease the electric current flowing through the load circuit to zero substantially. The operation detection circuit 7 receives the signals from the second comparator 2 and the flasher operation control circuit 4 and, when the L-terminal 21 is kept at a high level or open and the relay switch 10b is kept open, that is, when the switch 12 is open, produces a detection signal. The short-circuit discrimination circuit 8 receives a voltage signal developed at an S-terminal 22 and a flashing signal indicative of the lamp flashing from the flasher actuation circuit 3 and, when the flashing signal is absent and the electric current is flowing through the load circuit, that is, when the relay 10 is subjected to a response delay, discriminates the magnitude of the load current flowing through the load circuit. If the load current is in excess of a predetermined value, a discrimination signal indicative of the short-circuit in the load circuit is produced. The flasher operation prevention circuit 9 receives the discrimination signal from the short-circuit discrimination circuit 8 and produces a signal which stops the operation of the flasher actuation circuit 3 and the relay 10 for a predetermined interval of time.

The capacitor 16 connected outside the integrated circuit provides a slope on the output of the flasher actuation circuit 3 to prevent a relay coil 10a from generating a counter electromotive force. The resistors 17 and 18 connected outside the integrated circuit limit the currents flowing into the integrated circuit to protect the semiconductor elements when the abnormal voltage appears on the supply bus. The capacitor 23 connected outside the integrated circuit absorbs ignition pulses and giant pulses to protect the circuits.

Figure 3:
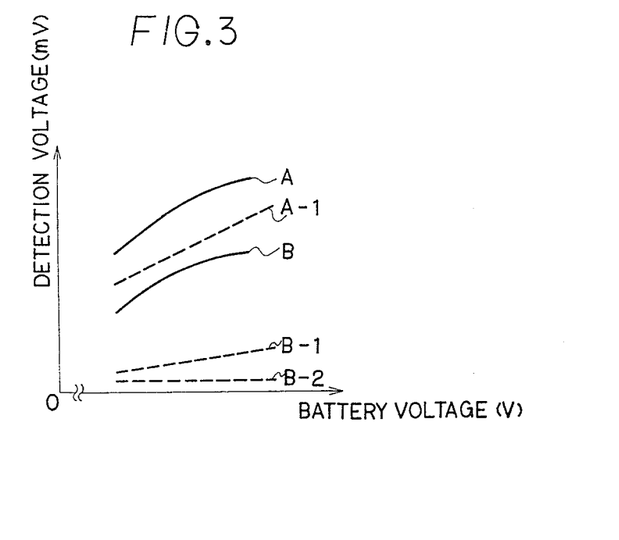

The detailed circuit construction of the block diagram illustrated in FIG. 1 is described next. Referring first to FIG. 3, relations between the voltage developed across the detecting resistor 11 and the voltage across the battery 20 are shown in respective cases where disconnection in the lamps 13 is absent and present. A characteristic curve A indicates the voltage in the case where none of the front, rear, side and interior lamps are disconnected (The lamps are in the normal condition.), while a characteristic curve B indicates the voltage in the case where the front or rear lamps is disconnected (The lamp is disconnected). In the general vehicle, each of the front and rear lamps consumes 23 watts, the side lamp consumes 8 watts and the interior lamp consume 3 watts in electric power. The parallel resistance of the lamps is 3 ohms.

Figure 2:
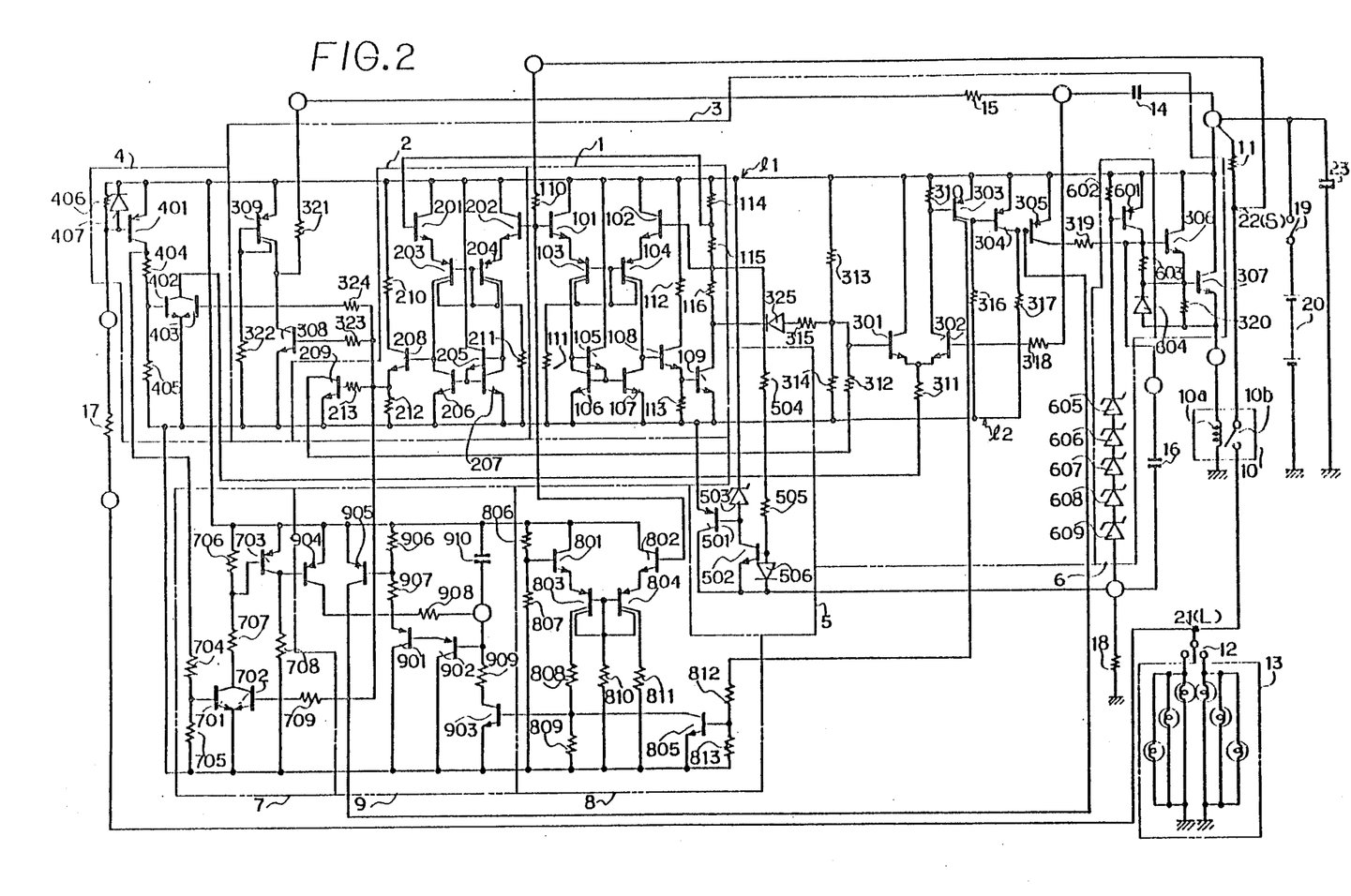
FIG. 2 is an electric wiring diagram showing the details of each blocks shown in FIG. 1, FIGS. 3 and 4 are a characteristic chart and a waveform chart used for explaining the operation of the embodiment.

Referring to FIG. 2, the first comparator 1 comprises transistors 101–109 and resistors 110–116 and receives the signal developed at the junction 22, S-terminal, between the resistor 11 and the relay switch 10b to compare it with the reference threshold value determined by the resistors 114–116, 504 and 505 so that the disconnection in the lamps 13 is detected. This threshold value is nearly intermediate between the curves A and B as shown by a characteristic curve A-1 in FIG. 3. The second comparator 2 comprises transistors 201–209, resistors 210–213 and resistors 114–116, 504 and 505 used in the first comparator 1 and receives the signal developed at the S-terminal 22 to compare it with the reference threshold value determined by the resistors 114–116, 504 and 505 so that the open and closed conditions of the switch 12 are detected. This threshold value is nearly close to zero as shown by a characteristic curve B-1 in FIG. 3. The curve B-1 may be replaced by a characteristic curve B-2.

The flasher actuation circuit 3 includes the oscillation circuit and the relay actuation circuit. The oscillation circuit includes the charge-discharge circuit comprising the resistor 15 and the capacitor 14, a comparator comprising transistors 301–305 and resistors 310, 311 and 316–319 for detecting the charged and discharged voltage across the capacitor 14, a charging current control circuit comprising transistors 308 and 309 and resistors 321–323 for controlling the charging current in response to the output of the comparator 2, a reference voltage circuit comprising resistors 312–314 for providing the comparator with a reference voltage, and a resistor 315 and a diode 325 for cooperatively change the reference voltage of the reference voltage circuit in response to the output of the first comparator 1 to thereby change the oscillation period and duty ratio of the oscillation circuit. This relay actuation circuit comprises transistors 306 and 307 and a resistor 320 and is controlled by the output transistor 305 of the oscillation circuit.

Instead of a diode, generally used for absorbing the counter electromotive force the capacitor 16 and the resistor 18 are connected to the base of the transistor 306 to prevent the counter electromotive force from being generated from the relay coil 10a. As a result, the output of the transistor 305 is provided with the slope dependent on a time constant determined by the capacitor 16 and the resistors 18 and 603 so that the transistors 306 and 307 are rendered ON gradually. The diode 604 conducts when a negative surge voltage appears on the supply line $1_1$ to reversely render the output transistor 307 ON so that the transistor 307 is protected by dividing the surge voltage by the transistor 307 and the resistance of the relay coil 10a. The transistor 309 is controlled by the resistor 322 in its base current and limits the charging current flowing upon conduction of the transistor 308 and the current flowing into the charge-discharge circuit.

The flasher operation control circuit 4 comprises a diode 407, transistors 401–403 and resistors 404–406. The transistors 402 and 403 are connected so that both transistors 402 and 403 are rendered OFF when the L-terminal 21 is kept at the high level and the transistor 208 of the second comparator 208 is rendered OFF to produce a low level output, that is, when the switch 12 is kept open. On the other hand, the transistors 402 and 403 are connected so that either one of the transistors 402 and 403 is rendered ON without fail when the switch 12 is kept closed. The constant voltage circuit 5 comprises resistors 504 and 505, a diode 506, transistors 501 and 502 and a zener diode 503 to regulate the voltage between the supply buses $1_1$ and $1_2$. The resistor 17 is connected to apply the voltage developed at the L-terminal 21 to the flasher operation control circuit 4. The abnormal voltage detection circuit 6 comprises resistors 602 and 603, a transistor 601, a diode 604 and a plurality of serially connected zener diodes 605–609. When the excessively high voltage appears on the supply bus $1_1$, the zener diodes 605–609 break down to regulate the voltage between the buses $1_1$ and $1_2$ at a predetermined zener voltage and render the transistors 601 and 307 ON forcibly.

The operation detection circuit 7 comprises transistors 701–703 and resistors 704–709. The transistor 703 is connected to be rendered OFF and ON when the switch 12 is kept open and closed respectively. The short-circuit discrimination circuit 8 comprises transistors 801–805 and resistors 806–813 to monitor the load current flowing after the nonconduction of the transistor 303 of the flasher actuation circuit 3. When the load current is in excess of a predetermined value, the transistors 801 and 803 are rendered ON. The flasher operation prevention circuit 9 comprises transistors 901–905, resistors 906–909 and a capacitor 910. The capacitor 910, the resistors 906 and 907 and the transistors 901 and 902 constitute a timer circuit. Until a predetermined interval of time (e.g. more than 20 seconds) passes after the nonconduction of the transistor 903, the transistors 905 is rendered ON to render the transistor 305 OFF so that a prevention signal is produced.

The above described circuits are designed to be integrated into the semiconductor chip. However, the capacitors 14, 16 and 23, the relay coil 10a, the relay switch 10b, and the resistors 11, 17 and 18 are not integrated but connected outside the semiconductor chip from the standpoint of precision, power consumption and difficulty in integration.

The operation of the flasher apparatus according to the present invention is described next. In the constant voltage circuit, first of all, the base voltage of the transistor 501 is kept proportional to the voltage on the supply bus $1_1$ by the transistor 502. As a result, the emitter voltage of the transistor 501, the voltage on the supply bus $1_2$, is also proportional to the voltage across the battery 20 and thus the voltage between the supply buses $1_1$ and $1_2$ is kept at a constant value (e.g. 5-7 volts).

It is assumed that the direction indicating switch 12 is kept open and the battery switch 19 is kept closed under the condition where none of the direction indicating lamps 13 is disconnected. Since the current detecting resistor 11 does not produce the detection voltage on this occasion, the voltage of the battery 20 is applied to the second comparator 2 through the resistor 110 so that the transistors 202 and 204–207 are rendered ON and the transistors 208 and 209 are rendered OFF. Since the voltage at the L-terminal 21 is kept at the high level, on the other hand, the transistor 401 is rendered OFF to render the transistors 402 and 403 OFF in the flasher operation control circuit 4. As a result, the oscillation of the oscillator is not enabled in the flasher actuation circuit 3. Since the transistors 308 and 309 are rendered OFF and ON respectively, the capacitor 14 does not charge nor discharge. The transistors 306 and 307 are rendered OFF in the relay actuation circuit to keep the relay switch 10b open.

When the switch 12 is closed, the voltage at the L-terminal 21 is changed to the low level so that the transistors 401 and 402 are rendered ON in the flasher operation control circuit 4 to enable the oscillation of the oscillator in the flasher actuation circuit 3. Since the capacitor 14 stores no electric charge on this occasion the voltage on the battery 20 is applied to the comparator through the capacitor 14 and the resistor 318. As a result, the transistors 302, 303 and 305 are rendered ON and the transistors 306 and 307 are rendered ON in the relay actuation circuit to energize the relay 10. Thus the lamps 13 start flashing. Since the resistor 11 produces the voltage on this instant, the transistors 201, 203, 208 and 209 are rendered ON in the second comparator 2 to render the transistor 308 ON. As a result, the capacitor 14 is allowed to start charging. During this charging condition, a charging path is formed from the battery 20 to the transistor 308 through the capacitor 14 and the resistors 15 and 321. Although the voltage at the L-terminal 21 is changed to the high level again to render the transistors 401 and 402 off, the oscillation in the flasher actuation circuit 3 is not stopped owing to the transistor 403 rendered ON. During this charging condition in which the resistor 11 produces the comparatively large voltage, the transistors 102 104, 108 and 109 are rendered ON in the first comparator 1 to establish the reference voltage $V_{L1}$ by the resistors 312–315. When the charge voltage of the capacitor 14 decreases below the reference voltage $V_{L1}$, the transistor 301 is rendered ON and the transistors 302, 303 and 305 are rendered OFF to render the transistors 306 and 307 OFF. As a result, the relay switch 10b opens to stop the flashing of the lamps 13. Since the resistor 11 produces no voltage on this occasion, the voltage on the battery 20 is applied to the first and second comparators 1 and 2 through the resistor 110. The transistors 201, 203, 208 and 209 are rendered OFF in the second comparator 2 to render the transistor 403 OFF in the flasher operation control circuit 4. Since the voltage at the L-terminal 21 is changed to the low level, the transistors 401 and 402 are rendered ON to keep the oscillation of the oscillator.

When the flashing of the lamps 13 is stopped, the transistors 102, 104, 108 and 109 are rendered OFF in the first comparator 1 and the transistor 209 is rendered OFF in the second comparator 2. The reference voltage in the oscillator is changed from $V_{L1}$ to $V_H$ determined by the resistors 313 and 314. Since the transistor 308 is rendered OFF, the discharging current flows into the capacitor 14 through the transistor 309 and the resistors 321 and 15. When the discharged voltage of the capacitor 14 increases above the reference voltage $V_H$, the transistor 301 is rendered OFF and the transistors 302, 303, 305, 306 and 307 are rendered ON. As a result, the relay switch 10b closes to enable the flashing of the lamps 13. The resistor 11 produces the voltage again to render the transistors 102, 104, 108 and 109 ON in the first comparator 1 and the transistors 201, 203, 208 and 209 ON in the second comparator 2. Thus the abovedescribed flashing of the lamps 13 is repeated periodically.

It is assumed next that one of the front and rear lamps 13 is disconnected. The reference voltage in the first comparator 1 is established as the characteristic curve A-1 in FIG. 3 in view of the resistance characteristic of the lamps 13 and the resistance of the resistor 11. While the lamps 13 are flashing, that is, the capacitor 14 is in the charging condition, the transistors 102, 104, 108 and 109 are rendered OFF to produce the high level output contrary to the case where none of the lamps 13 is disconnected. As a result, the reference voltage established in the oscillator of the flasher actuation circuit 3 is changed from $V_{L1}$ to $V_{L2}$ which is larger than $V_{L1}$ so that the difference between the reference voltage $V_H$ and $V_{L2}$ is decreased to decrease the oscillation period and duty ratio. It should be noted that, since the charged and discharged voltages of the capacitor 14 changes exponentially, the oscillation period and duty ratio are changed simultaneously by changing one of the reference voltages $V_H$ and $V_L$.

As described above, a memory function such as a flip-flop is not necessitated to detect the closure of the switch 12 because the flasher operation is kept by the second comparator 2 and the flasher operation control circuit 4. Therefore, even when the negative pulse sufficient to decrease the voltage of the battery 20 to zero appears on the supply bus $1_1$, the flasher apparatus temporarily stops flashing operation but restores the flashing operation thereafter. Thus erroneous flashing operation does not continue.

The circuit protection function of the abnormal voltage detection circuit 6 is described next. When the excessively high positive voltage appears on the supply bus $1_1$, the current flows through the emitter-base path of the transistor 601, the zener diodes 605–609 and the current limiting resistor 18 to render the transistor 601 ON to render the output transistors 306 and 307 ON forcibly. Since the current is limited by the resistor 18 on this occasion, the integrated circuit is never supplied with the voltage which is in excess of the sum of the voltages between the base-emitter path of the transistor 601 and the zener diodes 605-609. By designing the transistor 307 and the relay 10 to be sufficiently durable to the large current, the relay coil 10a which receives a portion of the excessive voltage is effective to prevent the circuit element such as the transistor 307 from breaking down. The resistor 17 also limits the current in the same manner as the resistor 18 does. When the excessively high negative voltage appears, on the other hand, the resistors 17 and 18 limit the current. The current flows through the relay coil 10a, the diode 604 and the collector-base path of the transistor 307 to render the transistor 307 ON reversely so that the current is limited by the inherent resistance (some 10 ohms) of the relay coil 10a. It should be noted that no diode which absorbs the counter electromotive force of the relay coil 10a is connected in parallel with the relay coil 10a. This is because that, if the diode is connected parallelly, the electric current flows there through in response to the excessively high negative voltage to break down the diode 604 or the transistor 307 within the integrated circuit. Instead of the diode, the inherent resistance of the relay coil 10a is effectively used to limit the current.

The short-circuit protecting function of the circuits 7, 8, and 9 is described next. Since either one of the transistors 701 and 702 is rendered ON without fail during the closure of the switch 12, the transistor 904 is continuously kept OFF to prevent the capacitor 910 from being short-circuited. While the transistors 302 and 303 are rendered ON in the flasher actuation circuit 3 to produce the flashing signal (see (A) of FIG. 4), the transistor 805 is rendered ON in the short-circuit discrimination circuit 8 to render the transistor 903 OFF forcibly. Soon after the transistors 302 and 303 are rendered OFF because of the decrease in the charged voltage of the capacitor 14, the relay switch 10b is still kept closed to allow the load current (see (D) of FIG. 4) to flow because of a response delay $T_3$ of the relay switch 10b (see (B) of FIG. 4, e.g. $T_3 = 5 \sim 10$ milliseconds). The load current is generally about $4 \sim 5$ amperes under the condition that none of the lamps 13 is disconnected. Therefore, the voltage developed by the resistor 11 is small enough to render the transistors 802 and 804 ON and the transistors 801 and 803 OFF. The transistor 903 is continuously kept OFF to keep the transistor 905 OFF. Thus, when none of the lamps 13 is disconnected, no protecting function is exhibited. It is also true, when some of the lamps 13 are disconnected to decrease the load current.

When one of the lamps 13 is shorted or a portion of the load current path is shorted, the load current (e.g. more than 10 amperes) which is larger than that of the case where none of the lamps 13 is disconnected keeps flowing even after the flashing signal has disappeared because of the OFFs of the transistors 303 and 805. The voltage across the resistor 11 becomes large enough to exceed the reference voltage determined by the resistors 806 and 807 and the transistors 801 and 803 are rendered ON to render the transistor 903 ON during the response delay time $T_3$ of the relay 10 (see (E) of FIG. 4). The capacitor 910 charges through the resistor 909 during this interval of time $T_3$. Soon after the start of charging, the transistors 901, 902 and 905 are rendered ON to apply the battery voltage to the collector of the transistor 303 of the flasher actuation circuit 3 so that the transistor 303 is rendered OFF forcibly.

After the relay switch 10b opens, the transistors 801, 803, and 903 are rendered OFF. However, since the electric charge stored on the capacitor 910 discharges through the resistors 906 and 907 and the transistors 901 and 902, the transistors 901, 902 and 905 are rendered ON for a predetermined interval of time $T_5$ (e.g. $20 \sim 100$ seconds, see (F) of FIG. 4) until the discharging is completed. Thus, the transistor 303 is rendered OFF forcibly. As a result, the output transistor 307 of the flasher actuation circuit 3 is rendered OFF during the interval $T_5$ irrespective of the output condition of the preceding circuit stage. The flashing of the lamps 13 is stopped. Since the transistors 308 and 309 are kept OFF and ON respectively, on this occasion, the capacitor 14 completes discharging.

Figure 4:
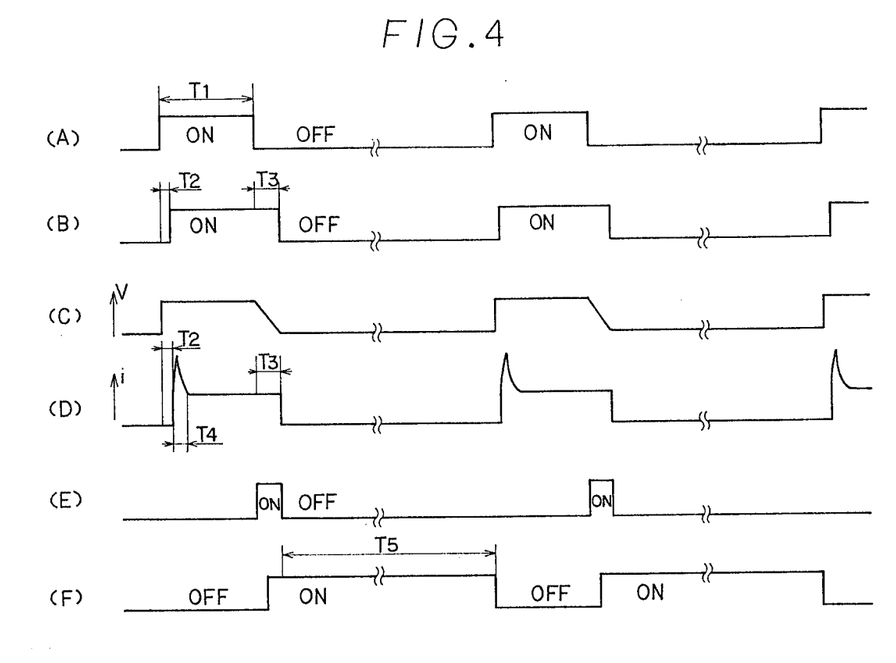

After the predetermined interval $T_5$ has passed, the transistors 901, 902 and 905 are rendered OFF and the transistors 302, 303, 305, 306 and 307 are rendered ON to close the relay switch 10b. Since the transistors 801, 803, and 903 are rendered ON soon after the transistor 303 has been rendered OFF, the timer circuit including the capacitor 910 stops the flashing of the lamps 13 during the predetermined interval $T_5$.

By determining the interval $T_5$ in which the flasher operation prevention circuit 9 prevents the flashing operation to be comparatively long by the circuit elements 901, 902, 906, 907, 909 and 910, the vehicle operator can recognize the malfunction of the flasher apparatus from the fact that the lamps 13 do not flash in the usual manner. Owing to the comparatively long interval $T_5$, the flashing interval is lengthened enough to decrease the total current flowing through the load circuit including the lamps 13 during the operation of the flasher apparatus. Thus, the secondary failures such as excessive overheat and burnout of the load circuit and the excessive discharging of the battery 20 are prevented. Instead of changing the flashing period as means for informing the short-circuit, an alarm such as a lamp may be activated by the timer circuit including the capacitor 910.

When the switch 12 is opened, on the other hand, the transistors 701, 702 and 703 of the operation detection circuit 7 are rendered OFF and the transistor 904 is rendered ON so that the electric charge remaining on the capacitor 910 is immediately discharged. As a result, when the switch 12 is closed to the other side, a stable flashing operation is ensured.

Assuming that the flashing frequency is 80 times per minute, the interval of time $T_1$ of the flashing signal shown in (A) of FIG. 4 is approximately $300 \sim 400$ milliseconds, the ON response delay $T_2$ of the relay switch 10b shown in (B) of FIG. 4 is approximately 1 millisecond, and the OFF response delay $T_3$ of the same is approximately $5 \sim 10$ milliseconds. Although dependent on the temperature of the lamp filament, the rush current of the load current shown in (D) of FIG. 4 is approximately $8 \sim 30$ amperes, while the load current is approximately $4 \sim 5$ amperes.

In FIG. 4, (C) shows the voltage across the relay coil 10a, (E) shows the switching condition of the transistor 903, and (F) shows the switching condition of the transistor 905.

Figure 5:
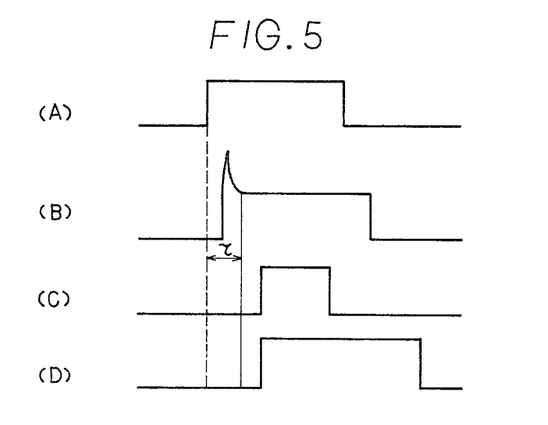
FIGS. 5, 6 and 7 are a waveform chart, an electric wiring diagram and an electric wiring diagram respectively showing the modifications of the short-circuit discrimination circuit.

The OFF response delay $T_3$ of the relay switch 10b shown in (E) of FIG. 4 is used to detect the short-circuit in the load circuit in the embodiment so that the short-circuit is not detected in response to the rush current (which is $2 \sim 10$ times larger than the load current) appearing at the ON time of the relay coil 10a. Instead, the short-circuit may be detected in response to the load current during the interval other than the interval $T_4$ in which the rush current appears. For example, as shown in FIG. 5, the magnitude of the load current may be monitored during the interval of a pulse signal (see (C) or (D) of FIG. 5) which is produced after a predetermined interval $\tau$ in which the rush current (see (B) of FIG. 5) appeared after the rise of the flashing signal (see (A) of FIG. 5) disappears.

Figure 6:
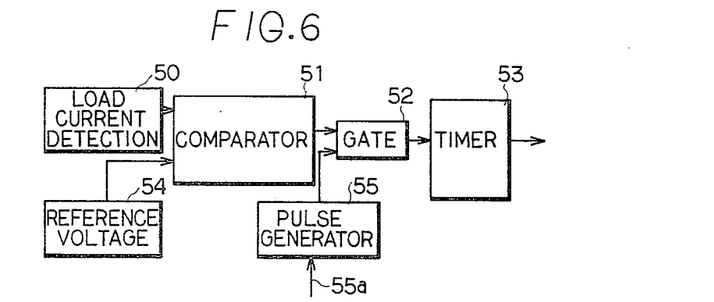
Figure 7:
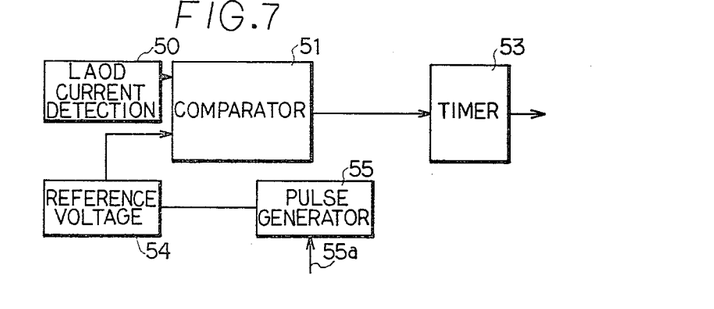

For this modification, the short-circuit discrimination circuit may be provided with a load current detection circuit 50, a comparator 51, a gate 52, a timer circuit 53, a reference voltage circuit 54 and a pulse generator 55 as shown in FIG. 6. The pulse generator 55 generates the pulse signal shown in (C) or (D) of FIG. 5 after the interval $\tau$ in response to the flashing signal 55a shown in (A) of FIG. 5 so that the gate 52 is opened to enable the short-circuit discrimination signal produced by the comparator 51 to pass to the timer circuit 53 which prevents the flashing operation of the lamps 13. It is also possible to apply the pulse signal of the pulse generator 55 to the reference voltage circuit 54 as shown in FIG. 7 so that the reference voltage is provided only during the interval of the pulse signal to detect the short-circuit. During the other interval, the reference voltage is not provided to prevent the short-circuit detection.

What we claim is:

1. In a turn direction indicating system of a vehicle in which one of two lamp groups is connectable to a battery through switch means by the closure of a turn direction indicating switch connected in series with said battery and said switch means, an apparatus comprising:
   signal generating means responsive to said turn direction indicating switch and effective to generate a train of flashing signals periodically during the closure of said turn direction indicating switch to said one of said two lamp groups;
   actuating means responsive to said flashing signals and effective to render said switch means conductive and nonconductive periodically in response to said flashing signals;
   current detecting means connected in series with said switch means and effective to produce thereacross a current detection signal proportional to the magnitude of said electric current;
   discriminating means responsive to said current detection signal and a reference signal having a predetermined magnitude and effective to produce a discrimination signal indicating that said current detection signal is in excess of said reference signal; and
   preventing means responsive to said flashing signals and said discrimination signal and effective to prevent said actuating means from actuating said switch means in response to said flashing signals during an interval of time longer than the period of each of said flashing signals when said discrimination signal is produced after a certain interval of time has passed from the beginning of each of said flashing signals.

2. An apparatus according to claim 1, wherein said switch means comprises:
   a relay coil connected to be energized by said actuating means in response to said flashing signals; and
   a relay contact connected in series with said battery and said turn direction indicating switch to be rendered conductive upon energization of said relay coil, and wherein said discriminating means comprises:
   comparator means effective to compare said current detection signal with said reference signal to thereby produce said discrimination signal; and
   means responsive to said flashing signals and effective to prevent said discrimination signal from being produced during the interval of each of said flashing signals.

3. An apparatus according to claim 2, wherein said preventing means comprises timer means responsive to said discrimination signal and effective to produce a timer signal having said certain interval of time, said timer signal being applied to said actuating means to thereby prevent said actuating means from actuating said switch means.

* * * * *